US008032351B2

(12) United States Patent
Stringham

(10) Patent No.: US 8,032,351 B2
(45) Date of Patent: Oct. 4, 2011

(54) RUNNING A VIRTUAL MACHINE DIRECTLY FROM A PHYSICAL MACHINE USING SNAPSHOTS

(75) Inventor: Russell R. Stringham, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 1182 days.

(21) Appl. No.: 11/565,494

(22) Filed: Nov. 30, 2006

(65) Prior Publication Data

US 2008/0133208 A1 Jun. 5, 2008

(51) Int. Cl.
*G06F 9/44* (2006.01)
(52) U.S. Cl. .......... 703/21; 703/22; 717/127; 717/131; 713/1; 707/200; 711/161; 711/162
(58) Field of Classification Search .............. 703/21, 703/22; 717/127, 131, 171; 713/1, 2; 711/161, 711/162; 718/100; 707/200
See application file for complete search history.

(56) References Cited

U.S. PATENT DOCUMENTS

| 2002/0162049 A1* | 10/2002 | Takamoto et al. | 714/12 |
|---|---|---|---|
| 2006/0085792 A1* | 4/2006 | Traut | 718/100 |
| 2008/0022032 A1* | 1/2008 | Nicholas et al. | 711/100 |
| 2009/0222496 A1* | 9/2009 | Liu et al. | 707/204 |

OTHER PUBLICATIONS

Orlando et al. Java Virtual Machine Monitoring for Dependability Benchmarking, Proceedings of the Ninth Int. Symposium on Object and Component-Oriented Real-Time Distributed Computing, Apr. 2006, pp. 1-8.*
Penhallurick, Methodologies for the use of VMware to Boot Cloned/Mounted Subject Hard Disk Images, Digital Investigation,vol. 2, Sep. 2005, pp. 209-222.*
Jackman (Get IT Done: Creating a test lab on one machine using VMware Workstation , TechRepublic, May 14, 2004 downloaded from articles.techrepublic.com/5100-10878_11-5195009. html).*
"Hardware abstraction layer," Wikipedia, http://en.wikipedia.org/wiki/Hardware_Abstraction_Layer, Oct. 10, 2006.

* cited by examiner

*Primary Examiner* — Russell Frejd
(74) *Attorney, Agent, or Firm* — Advantedge Law Group

(57) ABSTRACT

Embodiments of the present invention are directed to the running of a virtual machine directly from a physical machine using snapshots of the physical machine. In one example, a computer system performs a method for running a virtual machine directly from a physical machine using snapshots of the physical machine. A snapshot component takes a snapshot of the physical system volume while the physical system volume is in an operational state. The virtual machine initializes using the physical system volume snapshot thereby allowing the physical system volume snapshot to be a virtual system volume snapshot representing an initial state of a virtual system volume. The physical system volume snapshot includes instances of all the files within the physical system volume at the time the snapshot was taken.

18 Claims, 4 Drawing Sheets

RUNNING A VIRTUAL MACHINE DIRECTLY FROM A PHYSICAL MACHINE USING SNAPSHOTS

BACKGROUND OF THE INVENTION

Computers are used all over the world to perform a wide variety of tasks. Computers perform these tasks by processing software code which contains commands that are interpreted and executed by the computer. Software code is typically written by a developer using one or more scripting or programming languages. Because most software programs are quite complex and involve the interaction of multiple functions, variables and processes, it is often necessary for the software code, or at least portions thereof, to be rewritten more than once. A typical development cycle may include many different versions which are tested, patched and then retested. Furthermore, once a software product has been released, functionality problems continue to be found and customers continue to demand new features. Thus, whether it is fixing a major security hole, a simple user-interface problem or adding new features, software updates and patches have become a common method for developers to deliver software changes to the program users.

Such continual updating and patching, however, can be an inconvenience for a home user, but is much more than an inconvenience for an IT professional at a large corporation responsible for hundreds or thousands of computers. Many times, software updates and patches may cause more problems than they fix. Thus, especially in a corporate environment, the patch should be tested before it is released to all of the computers in the network. In such cases, it is very advantageous for the computer user to test the patch on computer hardware identical (or very similar) to the other computers on which the patch will be installed. Testing, however, requires setup time, making a backup of the current system, reinitializing (sometimes rebooting), reconfiguring, etc. Because of this, many computer users, especially those responsible for large networks, typically have separate computers reserved for testing patches and updates.

One way to cut down on the time spent backing up and initializing a computer for testing is to use a virtual machine. A virtual machine may be thought of as a computer within a computer. The virtual machine (VM) is started in a software program running on the host operating system (using e.g. VMware™). The VM initializes (e.g., boots) as a normal computer, using virtualization technology to access the physical machine's hardware. Thus, if the same operating system (OS) and software applications are installed on the VM as are running on the host, the VM will have the same qualities and characteristics as the host machine.

In this environment, a patch can be tested on the VM without affecting the physical host machine. Furthermore, setup time can be greatly reduced by taking a virtual machine "snapshot". A snapshot of a VM is basically an image of everything that is installed including operating system files, settings, drivers, data files, etc. Thus, the computer user can start up a VM, install an operating system and other programs such that the VM is identical to the host (physical machine), take a snapshot and begin testing. If the test fails, the IT professional can simply restart the VM using the snapshot from before the patch was installed and test the next patch. However, if the patch test was successful, the computer user must still reinstall the patch on the physical machine.

BRIEF SUMMARY OF THE INVENTION

Embodiments of the present invention are directed to systems and methods for running a virtual machine directly from a physical machine using snapshots of the physical machine. In one embodiment of the present invention, a computer system performs a method for running a virtual machine directly from a physical machine using snapshots of the physical machine. A snapshot component takes a snapshot of the physical system volume while the physical system volume is in an operational state. The virtual machine initializes using the physical system volume snapshot thereby allowing the physical system volume snapshot to be a virtual system volume snapshot representing an initial state of a virtual system volume. The physical system volume snapshot includes instances of all the files within the physical system volume at the time the snapshot was taken.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the present invention are directed to the running of a virtual machine directly from a physical machine using snapshots of the physical machine. In one embodiment of the present invention, a computer system performs a method for running a virtual machine directly from a physical machine using snapshots of the physical machine. A snapshot component takes a snapshot of the physical system volume while the physical system volume is in an operational state. The virtual machine initializes using the physical system volume snapshot of the physical machine thereby allowing the physical system volume snapshot to be a virtual system volume snapshot representing an initial state of a virtual system volume. The physical system volume snapshot includes instances of all the files within the physical system volume at the time the snapshot was taken. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 1:
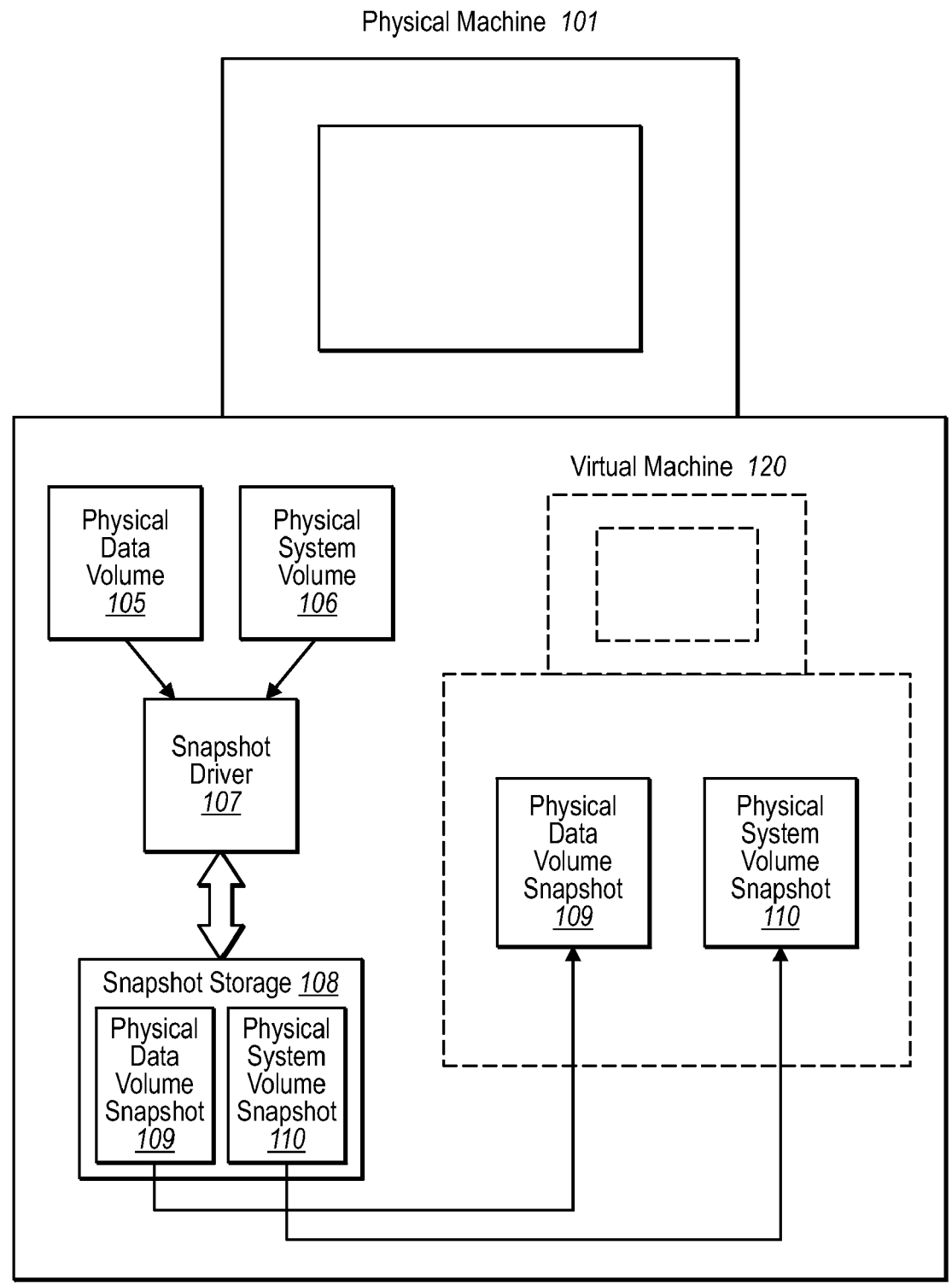
FIG. 1 illustrates a computer architecture in which embodiments of the present invention may operate including running a virtual machine directly from a physical machine using snapshots of the physical machine.

FIG. 1 illustrates a computer architecture 100 in which the principles of the present invention may be employed. As depicted, computer architecture 100 includes physical machine 101, which may be any type of computer system capable of running virtualization software. Physical machine 101 includes a physical data volume 105 and a physical system volume 106. Physical data volume 105 may be stored on any type of electronic storage device including hard drive, floppy drive, CD/DVD drive, portable memory stick, etc. In some embodiments, physical data volume 105 may include database information, data files or any other non-system information. Physical system volume 106 may likewise be stored on any type of electronic storage device. In some embodiments, physical system volume 106 may include system information including system settings, operating systems, applications, device drivers, and other types of files.

Figure 2:
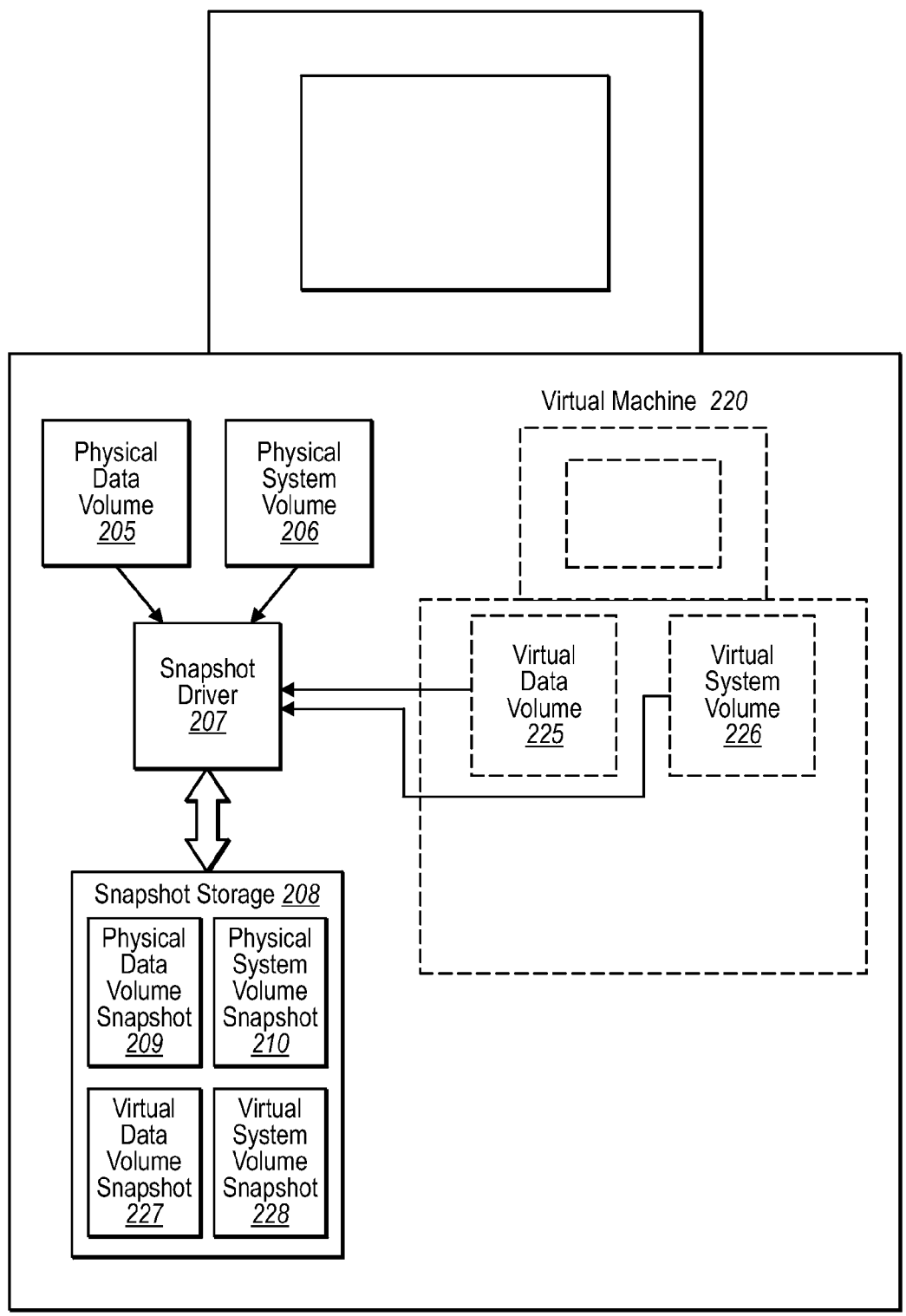
FIG. 2 illustrates an alternative computer architecture in which embodiments of the present invention may operate including running a virtual machine directly from a physical machine using snapshots of the physical machine.

Physical machine 101 also includes snapshot driver 107. In some embodiments, snapshot driver 107 may be configured to take snapshots of physical data volume 105 and physical system volume 106, as well as virtual data volume 225 and virtual system volume 226 (as illustrated in FIG. 2). In this description and in the claims, a "data volume" is defined as any collection of files or sectors that include data information. A "system volume" is defined as any collection of files or sectors that include system information. Thus, the data volume may be the data portions of one or more volumes, partitions, or drives, or perhaps just portions thereof. Furthermore, the system volume may be the system portions of one or more volumes, partitions, or drives, or perhaps just portions thereof. A snapshot can generally be described as a collection of files or sectors of a volume, depending on the scope of the snapshot. Snapshot driver 107 may be configured to monitor changes made to files and/or settings in any of volumes 105, 106, 225 or 226.

Physical machine 101 also includes snapshot storage 108. In some embodiments, snapshot storage 108 is configured to store snapshots of volumes such as physical data volume snapshots 109 and 209, physical system volume snapshots 110 and 210, virtual data volume snapshot 227 and/or virtual system volume snapshot 228. Snapshot storage 108 may be capable of storing any number of snapshots, for any number of physical or virtual machines. Physical machine 101 also includes virtual machine 120. Virtual machines can generally be described as a computer within a computer. A virtual machine initializes like a physical machine, has an operating system (the same as or different than the operating system (OS) on the physical machine), and, using hardware virtualization, has access to all of the drives, ports, and peripheral devices of the physical machine. Initializing can generally be described as configuring and starting hardware in order to run some type of software (e.g., an operating system), or starting a software application without necessarily starting hardware. In some embodiments, initializing is equivalent to booting. Physical machine 101 may be configured to host more than one virtual machine. Additionally or alternatively, virtual machine 120 may be run on a physical machine other than physical machine 101, accessing snapshots stored on physical machine 101 remotely (e.g. via a network).

Figure 3:
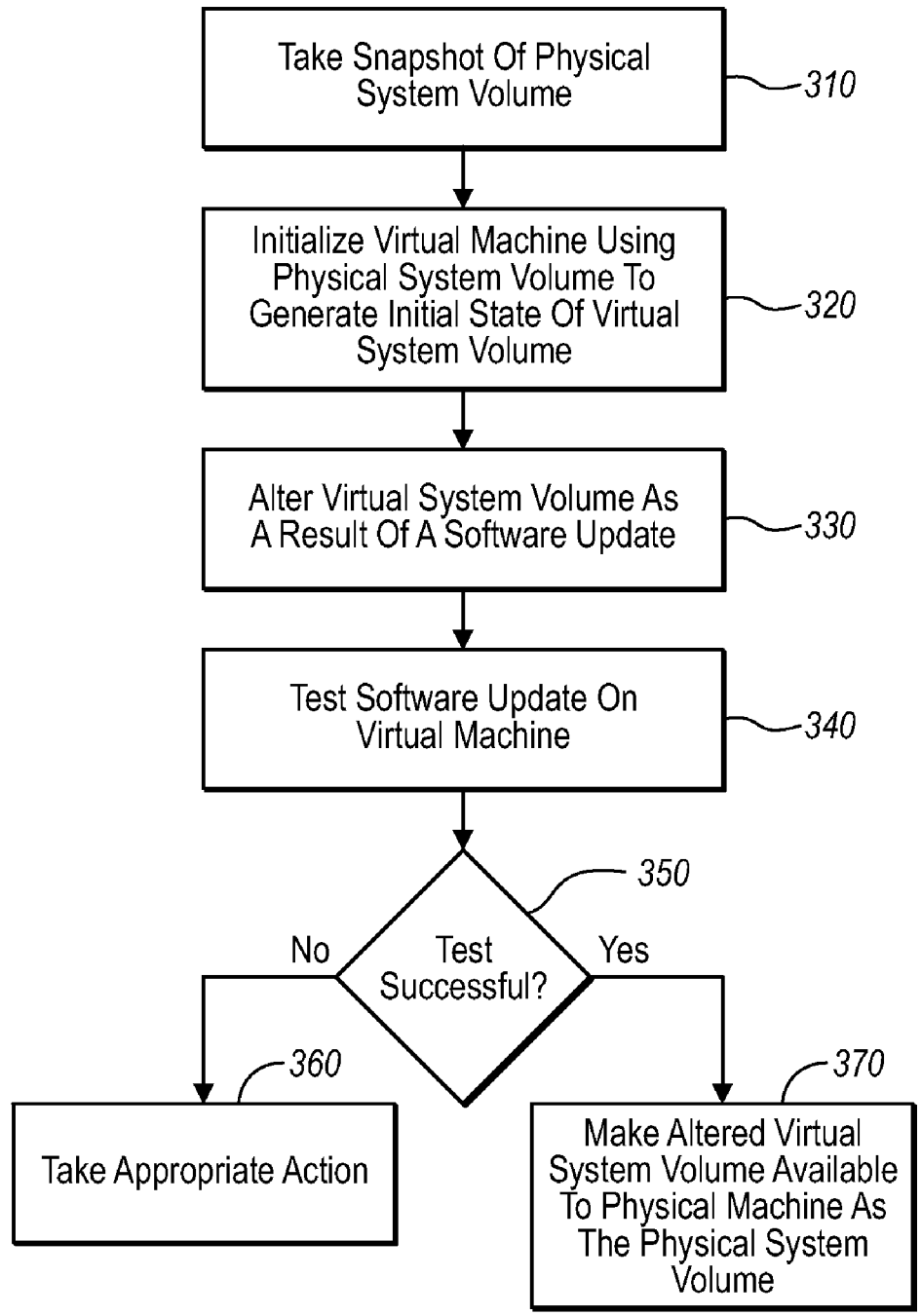
FIG. 3 illustrates a flowchart of an example method for running a virtual machine directly from a physical machine using snapshots of the physical machine.

FIG. 3 illustrates a flowchart of a method for running a virtual machine directly from a physical machine using snapshots of the physical machine. The method 300 will now be described with frequent reference to the components and data of computer architecture 100.

Method 300 includes an act of a snapshot component taking a snapshot of the physical system volume while the physical system volume is in an operational state (act 310). For example, snapshot driver 107 may take a snapshot of physical system volume 106 while physical system volume 106 is in an operational state. A snapshot, as explained above, is a collection of all of the files in a volume at the time the snapshot was taken. In some embodiments, snapshots are stored in a snapshot storage (e.g., snapshot storage 108). Snapshot storage 108 may be configured to store a plurality of snapshots. For example, as illustrated in FIG. 1, snapshot storage 108 is storing physical data volume snapshot 109 and physical system volume snapshot 110. In some embodiments, physical data volume 105 and physical system volume 106 may be stored in different partitions on the physical machine disk, or even on different disks.

Method 300 includes an act of the virtual machine initializing using the physical system volume snapshot thereby allowing the physical system volume snapshot to be a virtual system volume snapshot representing an initial state of a virtual system volume, wherein the physical system volume snapshot includes instances of all the files within the physical system volume at the time the snapshot was taken (act 320). For example, virtual machine 120 may initialize using physical system volume snapshot 110, where snapshot 110 includes instances of all the files within physical system volume 106 as the files existed at the time the snapshot was taken. In some embodiments in which virtualization software is used to run the virtual machine (e.g., virtual machine 120), the virtualization software may require settings or driver adjustments to be capable of initializing using a physical system volume snapshot (e.g., snapshot 110). For instance, if VMware™ virtualization software is used to create and run virtual machine 120, VMware™ may require additional code and/or settings adjustments in order to be able to initialize using physical system volume snapshot 110.

In some embodiments, virtual machine 120 may update the virtual system volume 226 (see FIG. 2) from the initial state as a result of a software update or patch installation (act 330). For example, if a software update is installed on virtual machine 120, the installation may install and overwrite files on virtual machine 120. Furthermore, the update installation may alter and/or overwrite files in virtual system volume 226. Continuing this embodiment, virtual machine 120 may be used to test software updates or patches for expected functionality (act 340). Because virtual machine 120 uses the same system volume as the physical machine does, the virtual machine is then operating using the same operating system (OS), applications, drivers and settings. Accordingly, updates tested on virtual machine 120 can give an accurate representation of what would occur if the update were to be installed on physical machine 101. In some cases, if the software update or patch functions as expected, the updated virtual system volume may be made available to the physical machine 101 as the physical system volume. Furthermore, changes made to the physical system volume 106 after the physical system volume snapshot 110 is taken may be selectively merged into the virtual system volume before the virtual system volume is used to initialize the physical machine.

In some embodiments, if the test is unsuccessful (No in decision block 350), appropriate action may then be taken (act 360) given the unsuccessful test. For instance, snapshot component 107 may take a snapshot of physical data volume 105 while the physical data volume is in an operational state. Physical data volume snapshot 109 and physical system volume snapshot 110 may be taken at approximately the same time. Physical data volume snapshot 109 may include instances of all, or a portion of, the files within the physical data volume at the time the snapshot was taken and any changes made by virtual machine 120 to the files of physical data volume snapshot 109 as a result of a software update are discarded upon reinitialization of physical machine 101. Other methods of appropriate action when a test is unsuccessful may include writing the test outcome to a log, shutting down virtual machine 120 and/or physical machine 101, and discarding the virtual machine snapshots.

In some embodiments, if the test is successful (i.e. the software patch functioned as expected) (Yes in decision block 350), the changes made to virtual system volume 226 are made available to physical machine 101 as the physical system volume 110 (act 370). In some cases, changes made by virtual machine 120 to the files of physical data volume snapshot 109 may be used to overwrite the files in physical data volume 105 upon reinitialization of the physical machine. Thus, in cases where changes are made by virtual machine 120 to the files of physical data volume snapshot 109, physical data volume 105 may be reinitialized by unmounting and remounting the physical data volume 105 with the file changes made by virtual machine 120. In cases where virtual machine 120 makes changes to physical system volume snapshot 110, physical machine 101 may be rebooted to reinitialize the physical system volume 106 with the changes made to the physical system volume snapshot 110.

Furthermore, in some embodiments where virtual machine 120 has the same operating system as physical machine 101, one or more files on virtual machine 120 may be executed and evaluated as to whether the executed files executed as expected or whether the execution indicated virus or spyware activity. Whereas most anti-virus programs merely go through a pseudo-execution of each file to determine what would happen if the file were actually executed, in a virtual environment, files can be executed and monitored to determine file activity. If one of the executed files indicates virus activity, the virtual machine 120 can be shut down. Then, the computer user can determine what to do with the infected file on physical machine 101. Furthermore, any system changes made by the virus to virtual system volume 226 will be limited to virtual machine 120 and can be discarded when virtual machine 120 shuts down and the snapshots 109 and 110 are discarded. Thus, physical machine 101 is not at risk for any type of virus infection resulting from execution of the infected file.

FIG. 2 illustrates an alternative computer architecture 200 in which principles of the present invention may be employed. Because of similarities between the figures, FIG. 2 will be described with frequent reference to computer architecture 100.

Computer architecture 200 includes a physical machine 201 and a virtual machine 220. As explained above, in some embodiments, physical machine 201 may host a plurality of virtual machines. Physical machine 201 includes a physical data volume 205, a physical system volume 206, a snapshot driver 207 and a snapshot storage 208. Snapshot storage 208 may store any number of snapshots, including physical data volume snapshot 209, physical system volume snapshot 210, virtual data volume snapshot 227 and virtual system volume snapshot 228. In some embodiments, snapshot driver 207 may be configured to use any of snapshots 209, 210, 227 or 228 to initialize physical machine 201 and/or virtual machine 220. Virtual machine 220 includes virtual data volume 225 and virtual system volume 226. In some embodiments, virtual data volume may include any changes made to data information and/or files on virtual machine 220. Similarly, virtual system volume may include any changes made to system information and/or files on virtual machine 220.

Figure 4:
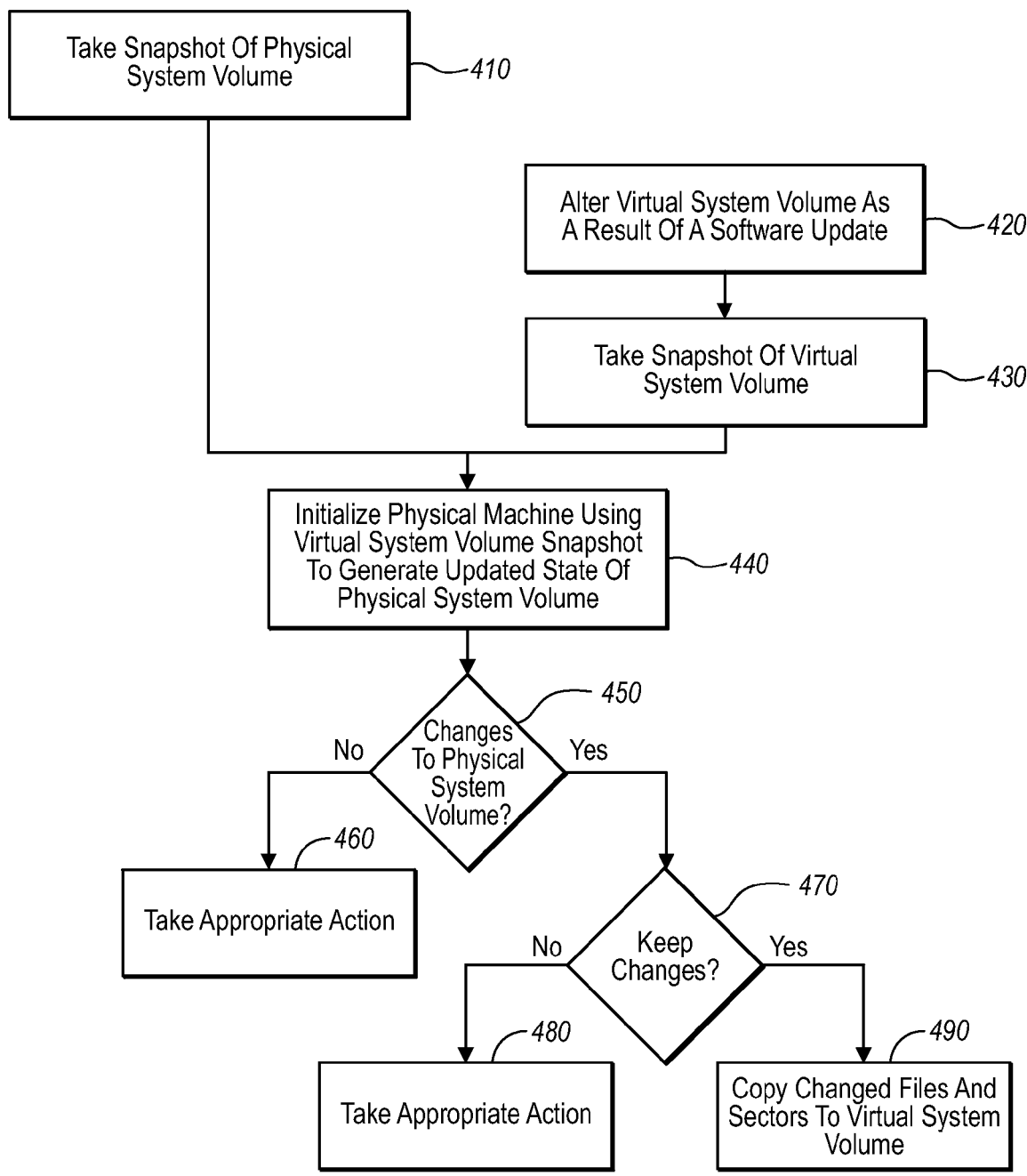
FIG. 4 illustrates a flowchart of an alternative example method for running a virtual machine directly from a physical machine using snapshots of the physical machine.

FIG. 4 illustrates a flowchart of a method for running a physical machine using snapshots of a virtual machine, and reconciling changes between the system volumes of the physical and virtual machines. The method 400 will now be described with frequent reference to the components and data of computer architecture 200.

Method 400 includes an act of a snapshot component taking a snapshot of the physical system volume while the physical system volume is in an operational state (act 410). For example, snapshot driver 207 may take a snapshot of physical system volume 206 while physical system volume 206 is in an operational state. In some embodiments, snapshot driver 207 may be configured to take snapshots of any volume, on a physical or virtual machine. For example, while physical machine 201 is running, snapshot driver 207 may take a snapshot of either or both of physical data volume 205 and physical system volume 206. Similarly, while virtual machine 220 is running, snapshot driver 207 may take a snapshot of either or both of virtual data volume 225 and virtual system volume 226. In some cases, snapshot driver 207 may be configured to store snapshots in snapshot storage 208. As explained above in regard to snapshot storage 108, snapshot storage 208 can store any number of physical volume or virtual volume snapshots. For example, snapshot storage 208 includes physical data volume snapshot 209, physical system volume snapshot 210, virtual data volume snapshot 227 and virtual system volume snapshot 228.

In some embodiments, virtual system volume 226 may be updated from the initial state as a result of a software update or patch installation (act 420). For example, one or more software updates and/or patches or perhaps entire software programs can be installed on virtual system volume 226, inherently changing files and/or sectors in volume 226 during the installation. Thus, in some embodiments, virtual volumes 225 and 226 may start out with the same initial state as physical system and data volume snapshots 209 and 210. Then, virtual volumes 225 and 226 are modified as a result of an update or patch installation, and snapshots are taken of the modified virtual volumes. In some cases, physical system volume 206 and virtual system volume 226 include data or a data volume.

Method 400 includes an act of the snapshot component taking a snapshot of the virtual system volume while the virtual system volume is in an operational state (act 430). For example, snapshot driver 207 may take a snapshot of virtual system volume 226 while virtual system volume 226 is in an operational state. In some cases, snapshot driver 207 may take a snapshot of virtual system volume 226 after files and/or sectors have been changed as a result of a software update or patch installation resulting in virtual system volume snapshot 228. Additionally or alternatively, snapshots 227 and 228 may be taken after updates and/or patches have been installed and the virtual machine 220 has been shut down. It should also be noted that virtual data volume snapshot 227 and virtual system volume snapshot 228 may be taken at any time after virtual machine 220 has been initialized (e.g. snapshots 227 and 228 may be taken before a patch installation, after a patch installation, or both, in which case the prior snapshots may be overwritten or new, separate snapshots may be created). As explained above, snapshot storage 208 may be configured to hold any number of snapshots, only limited by the amount of available storage space.

Method 400 includes an act of the physical machine initializing using the snapshot of the virtual system volume (act 440). For example, physical machine 201 may initialize using virtual system volume snapshot 228 to generate an updated state of the physical system volume 206. In some embodiments, snapshot driver 207 may be configured to store virtual system volume snapshot 228 in snapshot storage 208. Snapshot storage 208 may be made available to physical machine 201 during initialization. Thus, having access to virtual system volume snapshot 228, physical machine 201 can be configured to initialize using snapshot 228.

The differences between the virtual system volume snapshot and the physical system volume may then be reconciled, as represented by decision blocks 450, 470 and acts 460, 480 and 490 of FIG. 4. For example, physical machine 201 may be initialized using virtual system volume snapshot 228 (once again, act 440). Physical system volume snapshot 210 (taken during act 410) may be queried to determine whether any changes were made to files or sectors on physical system volume 206 (decision block 450) between the time of the physical system volume snapshot taken during act 410 and the time that the physical machine 201 was shut down as part of the reinitialization during act 440. In some embodiments, snapshot driver 207 may be configured to monitor and track any changes made to any of the physical machine's system or data volumes or the virtual machine's system or data volumes. Thus, physical machine 201 can use snapshot driver 207 to monitor and access physical system volume snapshot 210 to determine which files or sectors were changed after physical system volume snapshot 210 was taken.

If no changes were made to files or sectors on physical system volume 206 (No on decision block 450), appropriate action can be taken (act 460). In some embodiments, nothing more will need to be done. If changes were made to physical system volume 206 (Yes on decision block 450), those changes can be evaluated to determine whether the changes should be copied to virtual system volume 226 (decision block 470). In some embodiments, a computer user using physical machine 201 may make the determination. In some cases, the determination may be based on which files were changed or how the files were changed. In other cases, the determination may be based on which application changed the files.

If it is determined that the changes are not to be copied (No on decision block 470), then the changes may be discarded or other appropriate action may be taken (act 480). If it is determined that the changes are to be copied to virtual system volume 226 (Yes on decision block 470), the changed files and sectors may be copied to virtual system volume 226, which, in some cases, may be used as the physical machine's system volume (act 490). For example, if the evaluation indicates that changes to the files or sectors should be copied to virtual system volume 226, physical machine 201 may copy the changed files and sectors to virtual system volume 226. In some cases where applications are installed or patches are applied to physical system volume 206 while virtual machine 220 is running, it may be desirable to copy those changes to virtual system volume 226.

In some embodiments where virtual machine 220 has the same operating system as physical machine 201, one or more files on virtual machine 220 may be executed and evaluated as to whether the executed files executed as expected or whether the execution indicated virus or spyware activity. If one of the executed files indicates virus activity, virtual machine 220 can simply be shut down. Then, the computer user can determine what to do with the infected file on physical machine 201. Furthermore, any system changes made by the virus to virtual system volume 226 will be limited to virtual machine 220 and can be discarded when virtual machine 220 shuts down. Thus, physical machine 201 is not at risk for any type of virus infection resulting from execution of the infected file. For example, if a user on physical machine 201 launches an application, the copy of the application existing in virtual system volume 226 may immediately be run in virtual machine 220 with the same configuration and command line settings as on the physical machine. Not until the application runs successfully to some point in the virtual machine without a virus being detected will it actually be executed on the physical machine.

In an alternative embodiment, snapshot driver 207 may take a snapshot of the physical data and system volumes while the physical data and system volumes are in an operational state. Virtual system volume 226 may be updated from the initial state as a result of a software update or patch installation. Snapshot driver 207 may be configured to take a snapshot of the virtual system and data volumes while the virtual system and data volumes are in an operational state. Physical machine 201 may initialize using virtual system volume snapshot 228 to generate an updated state of the physical system volume 206, but continue to use the physical data volume. Continuing this embodiment, virtual data volume snapshot 227 may be queried to determine which files or sectors were changed from the time after snapshot 227 was taken. If it is determined that files or sectors were changed after snapshot 227 was taken, an evaluation may determine whether the changes to the files or sectors should be copied to physical data volume 205. If the evaluation indicates that changes to the files or sectors should be copied to physical data volume 205, the changed files and sectors may be copied to physical data volume 205. In some embodiments, software updates and/or patches may be tested for functionality on virtual machine 220. During the test, changes to files and/or sectors may be made to physical data volume 205.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product for implementing a method for a computing system to run a virtual machine directly from a physical machine using snapshots of the physical machine, the computer program product comprising one or more computer-readable storage media having thereon computer-executable instructions that, when executed by one or more processors of the computing system, cause the computing system to perform the method, the method comprising:
    an act of a snapshot component taking a snapshot of a physical system volume of the physical machine while the physical system volume is in an operational state; and
    an act of the virtual machine initializing using the physical system volume snapshot, thereby allowing the physical system volume snapshot to be a snapshot of a virtual system volume of the virtual machine representing an initial state of the virtual system volume, wherein the virtual machine accesses the same system volume as the physical machine;
    an act of the virtual machine updating the virtual system volume from the initial state as a result of a software update or patch installation;
    an act of testing the software update or patch on the virtual machine for expected functionality;
    an act of the snapshot component taking a snapshot of the virtual system volume while the virtual system volume is in an operational state;
    an act of the physical machine initializing using the snapshot of the virtual system volume thereby allowing the virtual system volume to be a physical system volume snapshot representing an initial state of the physical system volume, wherein:
    the virtual machine has the same operating system as the physical machine.

2. The computer program product of claim 1, wherein the method further comprises:
    an act of the snapshot component taking a snapshot of a virtual data volume of the virtual machine while the virtual data volume is in an operational state;
    querying the virtual data volume snapshot to determine which files or sectors have changed since the virtual data volume snapshot was taken.

3. The computer program product of claim 1, wherein the method further comprises selectively merging changes made to the physical system volume after the physical system volume snapshot is taken into the virtual system volume before the virtual system volume is used to initialize the physical machine.

4. The computer program product of claim 1, wherein the method further comprises an act of the snapshot component taking a snapshot of a physical data volume of the physical machine while the physical data volume is in an operational state, wherein:
    the physical data volume snapshot and the physical system volume snapshot are taken at approximately the same time;
    the physical data volume snapshot includes instances of at least a portion of files within the physical data volume at the time the snapshot was taken.

5. The computer program product of claim 4, wherein the method further comprises an act of selectively overwriting one or more of the files in the physical data volume with at least a portion of the file changes made by the virtual machine to the files of the physical data volume snapshot upon reinitialization of the physical machine.

6. The computer program product of claim 4, wherein the method further comprises merging changes made by the virtual machine into files on the physical machine.

7. The computer program product of claim 4, wherein the method further comprises unmounting and remounting the physical data volume to reinitialize the physical data volume with the changes made to the physical data volume snapshot.

8. The computer program product of claim 4, wherein the method further comprises rebooting the physical machine to reinitialize the physical system volume with the changes made to the physical system volume snapshot.

9. The computer program product of claim 1, wherein the method further comprises an act of using virtualization software to create and run the virtual machine.

10. The computer program product of claim 1, wherein the method further comprises storing snapshots in a snapshot storage.

11. The computer program product of claim 1, wherein
    the method further comprises executing one or more files on the virtual machine and evaluating whether the executed files executed as expected or whether the execution indicated virus activity.

12. The computer program product of claim 1, wherein the virtual machine is run on the same physical machine on which the physical system volume is located.

13. The computer program product of claim 1, wherein the virtual machine is run on an additional physical machine distinct from the physical machine on which the physical system volume is located.

14. On a computer system, a method for running a virtual machine directly from a physical machine using snapshots of the physical machine, the method comprising:
    an act of a snapshot component taking a snapshot of a physical system volume of the physical machine while the physical system volume is in an operational state;
    an act of the virtual machine initializing using the physical system volume snapshot, thereby allowing the physical system volume snapshot to be a snapshot of a virtual system volume of the virtual machine representing an initial state of the virtual system volume, wherein the virtual machine accesses the same system volume as the physical machine;
    an act of updating the virtual system volume from the initial state as a result of a software update or patch installation; and
    an act of testing a software update or patch on the virtual machine for expected functionality;
    an act of the snapshot component taking a snapshot of the virtual system volume while the virtual system volume is in an operational state;
    an act of the physical machine initializing using the snapshot of the virtual system volume thereby allowing the virtual system volume to be a physical system volume snapshot representing an initial state of the physical system volume, wherein
    the virtual machine has the same operating system as the physical machine.

15. The method of claim 14, further comprising:
    executing one or more files on the virtual machine; and
    evaluating whether the executed files executed as expected or whether the execution indicated virus activity.

16. The method of claim 14, wherein at least one of the physical system volume and the virtual system volume include data or a data volume.

17. On a computer system, a method for running a virtual machine directly from a physical machine using snapshots of the physical machine, the method comprising:
- an act of a snapshot component taking a snapshot of a physical data volume of the physical machine and a physical system volume of the physical machine while the physical data volume and the physical system volume are in an operational state;
- an act of the virtual machine initializing using the physical system volume snapshot, thereby allowing the physical system volume snapshot to be a snapshot of a virtual system volume of the virtual machine representing an initial state of the virtual system volume, wherein the virtual machine accesses the same system volume and the same data volume as the physical machine while the system volume and the data volume are in an operational state on the physical machine;
- an act of the snapshot component taking a snapshot of the virtual system volume while the virtual system volume is in an operational state;
- an act of the physical machine initializing using the snapshot of the virtual system volume thereby allowing the virtual system volume to be a physical system volume snapshot representing an initial state of the physical system volume, but continuing to use the physical data volume.

18. The method of claim 17, further comprising:
- updating the virtual system volume from the initial state as a result of a software update or patch installation; and
- testing a software update or patch on the virtual machine for expected functionality.

* * * * *